Dec. 15, 1970   J. R. LEPKOWSKI   3,546,778
MENSURATION RETICLES FOR TUBE MAGNIFIERS
Filed April 7, 1969   2 Sheets-Sheet 1
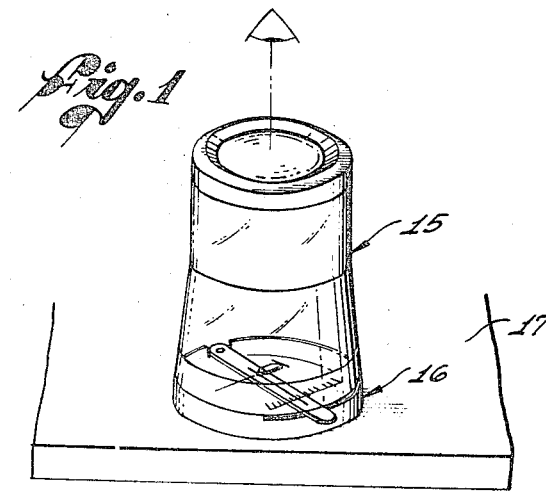
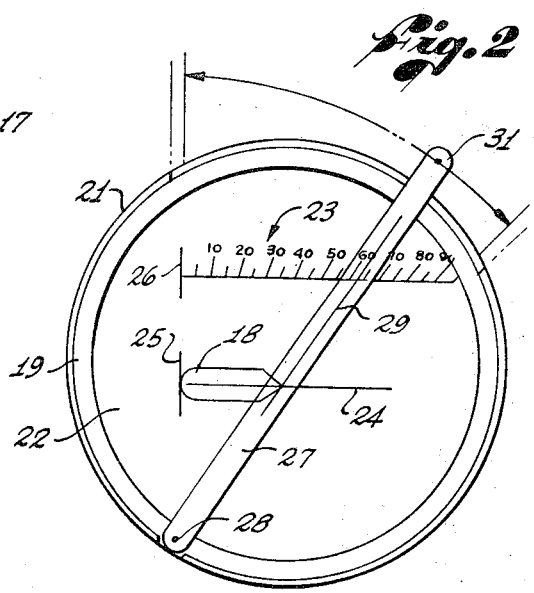
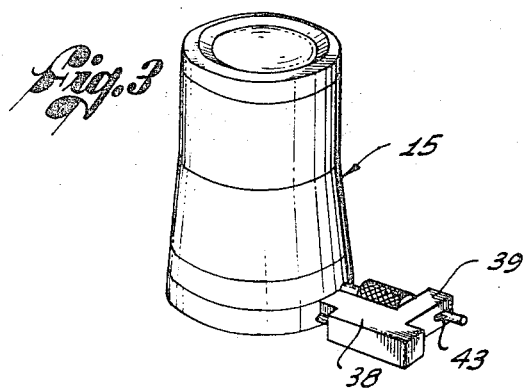
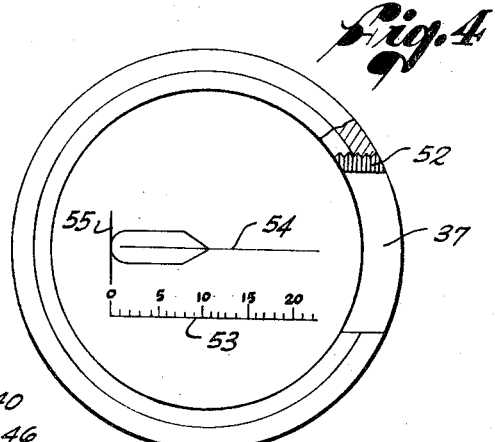
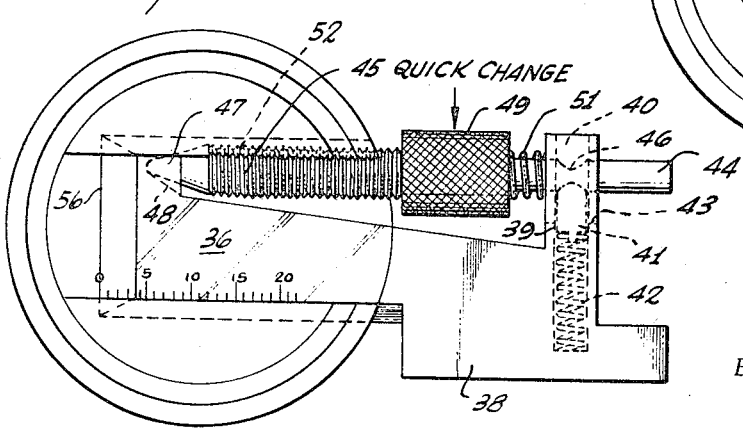
INVENTOR.
JOSEPH R. LEPKOWSKI
BY Fulwider, Patton, Rieber,
Lee, and Utecht
ATTORNEYS

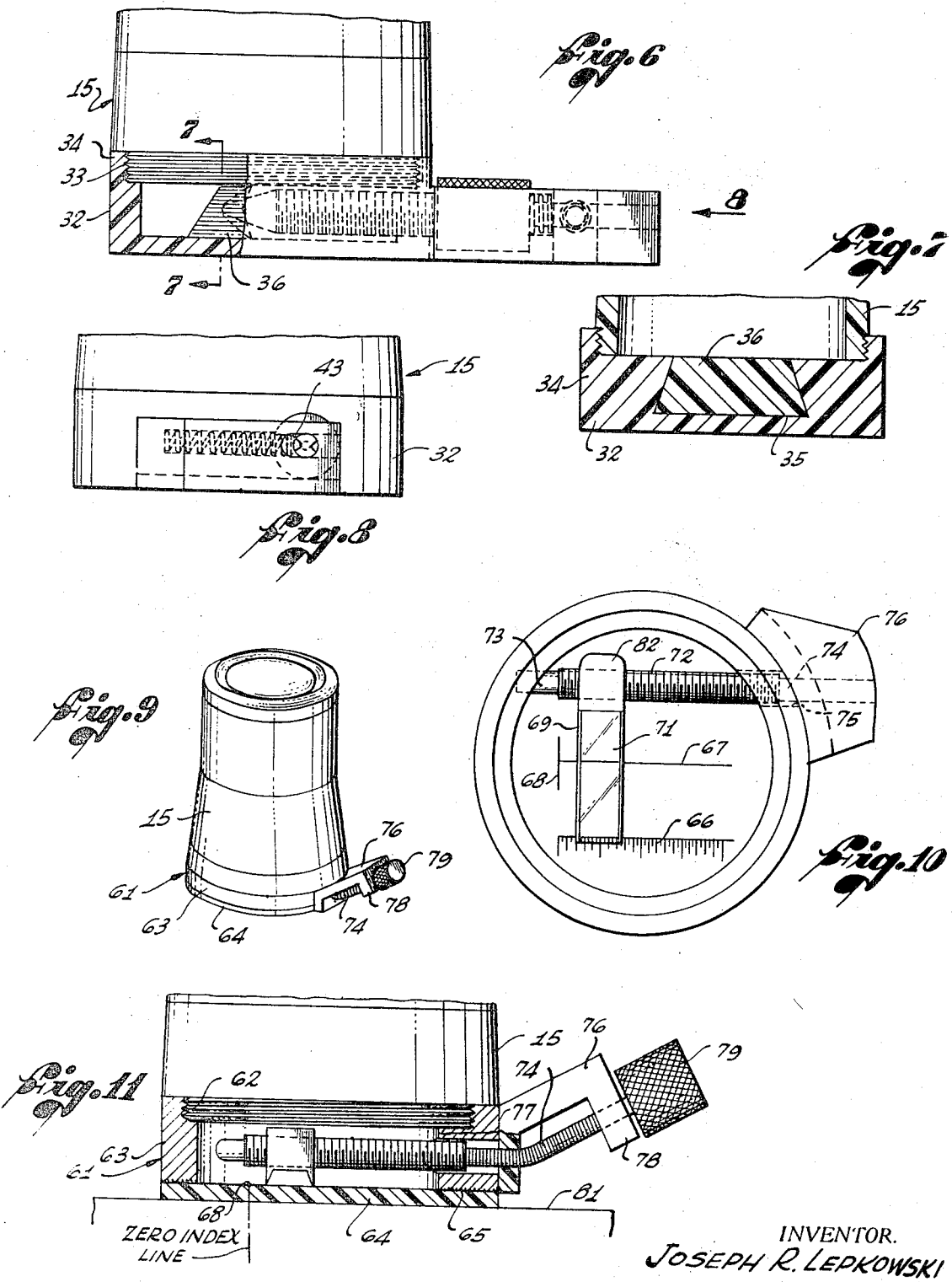

United States Patent Office 3,546,778
Patented Dec. 15, 1970

3,546,778
MENSURATION RETICLES FOR
TUBE MAGNIFIERS
Joseph R. Lepkowski, Arlington, Va., assignor to System
Development Corporation, Santa Monica, Calif., a general profit corporation of California
Filed Apr. 7, 1969, Ser. No. 813,840
Int. Cl. G01b 3/00
U.S. Cl. 33—1
12 Claims

ABSTRACT OF THE DISCLOSURE

Mensuration reticles for measuring small objects, especially photographic images, which have an alignment axis remote from a scale, a zero index well inside the field of view of the magnifier, and a manipulatable index line for indexing the end of the object to be measured opposite the end engaging the zero index line, with the manipulatable index line intersecting the scale to indicate a reading thereon. Three physical embodiments are disclosed, in one of which the index line is mounted on a pivoted lever, in a second of which a rectilinearly movable index line has an adjusting screw which is disengageable from stationary threads for coarse adjustment, and in a third of which the manipulatable index line is mounted on an extension on a traveling nut.

BACKGROUND OF THE INVENTION

The present invention is directed to the field of measuring small objects, such as photographic images, by tube magnifiers employing mensuration reticles and associated mechanisms.

Mensuration reticles presently available for tube magnifiers have inherent disadvantages and require the user to perform a number of simultaneous activities which are both time-consuming and sources of errors. Many such reticles have a zero index near the periphery of the reticle, with the scale running clear across the field of view, and produce an uncomfortable sensation in the eye due to the optical qualities of the tube magnifier lens. They further align the scale along the axis of the object to be measured and when the scale is so placed on top of the object it tends to obliterate it, requiring movement of the reticle to make both ends of the object visible, which usually requires resetting of the zero index. Such reticles further require shifting of the visual focal point between the trailing end of the object and the scale. Usually, interpolation is required and repeated shifts of the focal point are necessary for vertification. In addition, with some photographic imagery, a numerical scale blends in with the background and cannot be read easily. Attempts have been made to overcome this last difficulty by using scales of different color to provide more contrast, but this introduces the objection that increase in scale contrast in the middle of the field of view produces an increase in distractability when locating objects beyond the reticle plane.

SUMMARY OF THE INVENTION

The difficulties described above are all overcome in the mensuration reticles for tube magnifiers according to the present invention. Three separate embodiments are disclosed and the difficulties with the scale, axis line, zero index line and read-out are overcome by separating the axis line from the numerical scale, by locating the zero index line well within the field of use where it may easily be seen without eyestrain and need not be moved to make both ends of the object to be measured visible, and by providing a manipulatable index line which may be aligned with an end of the object to be measured and provide a direct reading on the numerical scale where the manipulatable index line intersects it. If the background does not provide enough contrast to read a scale, the reticle with the manipulatable index line held in fixed position can be moved elsewhere, such as over a piece of white paper or a source of light for reading the scale. In one embodiment of the invention, the manipulatable index line is carried on a pivoted lever pivoted adjacent an edge of the reticle and with the scale mounted on the opposite side of the axis line to provide an expanded scale giving easier reading thereon of the length of the object to be measured. In all the exemplifications, the reticle is preferably threaded to be mounted thereby on a standard tube magnifier, although it may be cemented or otherwise attached thereto.

In another embodiment of the invention, the manipulatable index line is rectilinearly movable by means of a screw which threads into a fixed part and is bodily movable with the piece on which the index line is mounted. The feed screw is disengageable from the fixed threads for coarse bodily adjustment, after which it may be reengaged with the fixed threads for fine positioning of the index line at the end of the object.

In a third design, the index line is mounted on a longitudinally fixed screw which rotates without axial movement and which may be turned by a flexible shaft having a knob elevated from the surface to be viewed so as to elevate it into a more accessible position.

Other objects and features of the invention will be apparent to those skilled in the art from the following specification and the appended drawings.

BRIEF DESCRIPTION OF THE DRAWINGS

FIG. 1 is a perspective view of a tube magnifier and mensuration reticle according to the present invention;

FIG. 2 is a plan view of the reticle as seen through the magnifier;

FIG. 3 is a perspective view of a second embodiment of the invention;

FIG. 4 is a partial view of the reticle of FIG. 3 with the manipulatable index line part removed;

FIG. 5 is a plan view of the reticle of FIGS. 3 and 4 with the tube magnifier removed therefrom;

FIG. 6 is an elevational view, with parts broken away, of the magnifier reticle of FIGS. 3–5;

FIG. 7 is a detail sectional view of the line 7—7 of FIG. 6;

FIG. 8 is a partial elevational view in the direction of the arrow 8 of FIG. 6;

FIG. 9 is a perspective view of a third embodiment of the invention;

FIG. 10 is a plan view of the reticle of FIG. 9 with the tube magnifier removed and parts broken away; and FIG. 11 is a partial elevational view of the magnifier and reticle of FIG. 9 with the reticle shown in vertical section.

DESCRIPTION OF THE PREFERRED EMBODIMENTS

In the embodiment of FIGS. 1 and 2, a standard tube magnifier 15 has attached to its lower end, as by being threaded thereon, as shown in FIGS. 6 and 11, a mensuration reticle 16 which rests on a surface 17 on which there is an image of an object 18 whose length is to be measured. The mensuration reticle 16 comprises an outer ring 19 having an upwardly extending threaded lip 21 for attachment to the bottom of the tube magnifier, it being also understood that it may be cemented thereon or frictionally engaged therewith. The tube magnifier may be of any desired form and the mensuration reticle configuration illustrated in the drawing will fit on a standard Bausch & Lomb 7× tube magnifier such as shown generally at 15.

The body of the tube magnifier 15 may be opaque, or, if desired, made transparent for better illumination of the object to be viewed.

The reticle 16 supports within the ring 19, either integrally or as a separate part, a clear plastic disc 22 having etched, stamped or otherwise marked thereon a numerical scale 23 and an axis line 24 parallel thereto and spaced therefrom and providing a zero index line at the end thereof at 25 aligned with the end 26 of the scale 23. A clear plastic lever 27 is pivoted to the ring 19 at 28 on the side of the axis line 24 opposite the scale 23 so that the scale 23 is expanded. The lever 27 is provided with a manipulatable index line 29 which intersects the scale 23 to indicate a reading thereat, and has an end 31 extending beyond the ring 19 to be engaged by the finger of the viewer. The scale 23 may have its indicia calibrated to give a direct reading of the length of the object 18, this being determined by the distances between the pivot 28, the axis line 24 and the scale 23 in the relative positions thereof. The scale may alternatively be curved concentrically or non-concentrically to the pivot 28.

The operation of the tube magnifier and reticle of FIGS. 1 and 2 is as follows:

The magnifier tube is placed over the object to be measured with the reticle axis line 24 located over the axis of the object 18 to be measured so that the line intersects the points between which the size is to be determined. The magnifier and reticle are then slid in the direction of the axis line until the zero index line 25 appears to just touch one of the points between which the size is to be determined, as shown in FIG. 2, the left-hand end of the object 18. The lever 27 is then swung until the manipulatable index line 29 intersects the other point between which the size is to be determined, as shown in FIG. 2, the right-hand end of the object 18. The value or length of the object 18 is then read on the scale 23 where the line 29 intersects it. If the background does not provide enough contrast to read the scale, the lever 27 may be held stationary while the tube and reticle are transferred to a light or white paper surface, for example, to give the proper contrast for easy reading.

In the embodiment of FIGS. 3–8, the tube magnifier 15 has a transparent reticle 32 mounted on its bottom end, as by threading at 33, on the upstanding lip 34. The reticle 32 has a transverse dovetail notch 35 therein in which is mounted a transparent plastic dovetail body 36, the dovetail notch 35 extending through one side of the reticle to provide an opening 37 at the side through which the body 36 extends to provide an integral portion 38 at the exterior of the reticle. The exterior portion 38 includes a solid integral arm 39 extending at right angles to the axis of the dovetail body 36 and having a tubular bore 40 therein. A retaining element 41 is slidable in the bore 40 and is biased outwardly by a helical compression spring 42. The arm 39 has an axially-extending transverse slot 43 therethrough through which extends the smooth shaft end 44 of an adjusting screw 45. The shaft 44 has an annular indexing groove 46 therein into which extends the nose at the end of the retainer 41. The screw 45 has a smooth pointed tip 47 seated in a socket 48 in the dovetail body 36 and also has a knurled knob 49 rigidly mounted thereon and a spring 51 is mounted between the knob 49 and the arm 39 to rigidify the parts and prevent involuntary rotation of the screw. The screw engages at one side with partial complementary screw threads 52 at the edge of the opening 37 in the reticle.

The reticle 32 has etched or otherwise marked on its planar surface a scale 53, an axis line 54 spaced therefrom, and a zero index line 55. The manipulatable index line may be the back edge 56 of the dovetail body 36 or any other line placed thereon which will intersect the scale 53 with the parts dimensioned as shown.

In the operation of the embodiment of FIGS. 3–8, the axis line 54 is placed over the points between which the dimension is to be measured, and the reticle is slide along this line until the zero index line 55 aligns with one of these points. The manipulatable index line 56 is then moved into alignment with the other point, with the initial movement quickly done by making a gross adjustment provided for by moving the shaft 44 against the spring 42 toward the portion 38 until the threads of the screw 45 are disengaged from the threads 52 of the reticle ring, whereupon the dovetail body 36 may be bodily moved until the index line 56 is approximately aligned with the other point. Upon release of the shaft 44, the screw threads engage with the threads 52 under the bias spring 42 and the final adjustment of the manipulatable index line into exact coincidence with said other point made by turning the screw from the knurled knob 49 with the tip of a finger. The gross adjustment of the dovetail body by disengaging the screw threads greatly shortens the operating time to move the manipulatable index line 56 to different positions. The reticle 32 is shown as having a unitary body, but it may obviously be formed of a ring and a separate bottom plate, as in the next embodiment.

The third embodiment of the invention is illustrated in FIGS. 9 through 11 and has a tube magnifier 15 on which is mounted a mensuration reticle 61, as by screw threads 62 on the end of the tube and on the inside of the reticle ring 63. The ring 63 has its bottom closed by a transparent plastic reticle plate cemented to the bottom surface thereof, as at 65. The reticle plate 64 has located on its surface by any desired means, a scale, an axis line 67 parallel thereto, and a zero index line 63.

A manipulatable index line 69 may be located anywhere on a transparent traveling member 71, for convenience being shown at the left-hand edge thereof. A rotatable only screw 72 has a shaft end 73 held in a complementary socket in the ring 61 and its opposite end connected to a flexible shaft 74 extending freely through an opening 75 in the ring 61 so that the axis of the screw 72 is parallel to the axis line and the scale. A shaft supporting arm 76 may be cemented or otherwise connected to the ring 61 at 77 and has an angularly located arm 78 thereon through which the flexible shaft 74 extends to have its end connected to a knurled knob 79 which is thereby elevated above the surface 81 on which the object to be measured is located. This facilitates engagement of the knurled knob by the fingers without interference from the surface 81. The end of the transparent member 71 opposite the scale 66 has a solid body 82 which is threaded to engage the screw 72 as a traveling nut thereon, so that upon rotation of the screw 72, the member 71 and the manipulatable index line 69 thereon move bodily in a rectilinear direction parallel to the axis line 67. When the index line 69 is aligned with the second of the points, the distance between which is to be measured, the intersection of the line 69 with the scale 66 enables the distance between the points to be read on the scale.

Various modifications and changes may be made with regard to the foregoing detailed description without departing from the spirit of the invention.

I claim:

1. A mensuration reticle for a magnifier tube comprising:
   a reticle body;
   a transparent bottom on said body through which an object to be measured is viewed, said bottom providing a planar surface;
   an axis line on said surface adapted to be aligned with an axis along which a measurement is to be made;
   a zero index on said axis line and substantially within the field of view of said planar surface, said zero index line being adapted for alignment with one of two points, the distance between which is to be measured;
   a scale on said surface and laterally offset from said axis line so that the indicia thereon do not obscure the object at the axis line;
   a transparent element adjacent said surface;
   means mounting said element for movement across said surface and parallel thereto; and an index line on said element adapted to be aligned with the other of said two points and intersecting said scale to give a reading at its indicia of the distance between the points being measured.

2. The reticle defined in claim 1 in which the zero point on said scale and said zero index are substantially in alignment at right angles to said axis line.

3. The reticle of claim 1 in which:
said transparent element is a pivoted arm; and
means pivoting said arm adjacent the edge of the reticle spaced laterally of said axis line oppositely to the scale.

4. The reticle of claim 3 in which the pivot point of the arm is aligned with said zero index and scale zero indicia and said element index line is aligned with said pivot.

5. The reticle of claim 1 in which:
said transparent element is mounted in said reticle for rectilinear movement parallel to the axis line;
screw means resiliently engaging said element to effect said rectilinear movement thereof, said element index line being disposed at right angles to its direction of movement;
partial screw threads on said reticle body engaged by said screw means for fine adjustment of said transparent element and its index line; and
means mounting said screw means for disengagement from said partial threads to effect gross bodily movement of the transparent element independently of the threads.

6. The reticle of claim 5 including:
means biasing said screw means into normal engaged relation with said partial threads.

7. The reticle of claim 5 including:
a projecting tube on said transparent element exteriorly of said reticle body;
a slot extending transversely through said tube and receiving one end of said screw means therethrough;
spring means in said tube biasing the screw means into partial thread engagement and against which the screw means moves to disengage position.

8. The reticle of claim 7 including:
a pocket in said transparent element into which the opposite end of said screw means projects; and spring means between a part rigid with said screw means and rigid with said transparent element for biasing said opposite end of the screw means into said pocket.

9. The reticle of claim 7 including:
a peripheral groove on said screw means substantially aligned with the axis of said tube; and
an indexing retainer in said tube between the spring therein and said screw means, said retainer having a nose projecting into said peripheral groove.

10. The reticle of claim 1 including:
a lead screw pivotally mounted in said reticle for rotative only movement and having its axis offset from and parallel to said axis line; and
said transparent element being a traveling nut threaded on said lead screw and extending at right angles thereto to intersect said scale.

11. The reticle of claim 10 in which the element index line is located at right angles to said axis line and lead screw axis; and
said lead screw is located on the side of said axis line opposite to the scale.

12. The reticle of claim 10 including:
a flexible shaft connected to said lead screw for rotating it;
means directing the exterior end of said flexible shaft upwardly from the base of the reticle to clear a surface on which it rests; and
an operating knob on the exterior end of said shaft.

References Cited

UNITED STATES PATENTS

| 581,472 | 4/1897 | Shaver | 33—143(B) |
| 1,363,670 | 12/1920 | Parker et al. | 33—64(B) |
| 1,528,944 | 3/1925 | Newell | 33—148(EUR) |
| 2,048,879 | 7/1936 | Moran | 33—1(BB) |
| 3,119,185 | 1/1964 | Gray | 33—46 |

SAMUEL S. MATTHEWS, Primary Examiner

U.S. Cl. X.R.

33—46, 64, 125, 148; 356—171